United States Patent
Hasegawa

(10) Patent No.: US 8,502,874 B2
(45) Date of Patent: Aug. 6, 2013

(54) IMAGE RECORDING APPARATUS AND CONTROL METHOD

(75) Inventor: Hiroyuki Hasegawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 13/312,918

(22) Filed: Dec. 6, 2011

(65) Prior Publication Data

US 2012/0147221 A1 Jun. 14, 2012

(30) Foreign Application Priority Data

Dec. 13, 2010 (JP) ................................ 2010-277179

(51) Int. Cl.
*H04N 5/225* (2006.01)
*H04N 9/04* (2006.01)
*H04N 5/76* (2006.01)
*H04N 5/222* (2006.01)

(52) U.S. Cl.
USPC ............ 348/207.1; 348/231.99; 348/231.3; 348/231.9; 348/333.02; 348/333.04

(58) Field of Classification Search
USPC ........... 348/207.99–207.2, 211.99–211.14, 348/222.1, 231.99–231.9, 333.01–333.13
See application file for complete search history.

(56) References Cited

U.S. PATENT DOCUMENTS

| 5,806,005 | A | * | 9/1998 | Hull et al. ...................... 455/566 |
| 6,715,003 | B1 | * | 3/2004 | Safai .............................. 710/33 |
| 6,999,112 | B2 | * | 2/2006 | Seaman et al. ............. 348/207.1 |
| 2002/0036698 | A1 | * | 3/2002 | Mizutani ...................... 348/232 |
| 2003/0032436 | A1 | * | 2/2003 | Mikuni ......................... 455/457 |
| 2004/0021780 | A1 | * | 2/2004 | Kogan ....................... 348/231.3 |
| 2005/0104976 | A1 | * | 5/2005 | Currans .................... 348/231.5 |
| 2009/0195663 | A1 | * | 8/2009 | Perotti et al. ............. 348/207.99 |
| 2011/0019007 | A1 | * | 1/2011 | Elazar et al. .............. 348/207.1 |
| 2011/0157470 | A1 | * | 6/2011 | Tsuruga et al. ............... 348/554 |

FOREIGN PATENT DOCUMENTS

JP 2007-88754 A 4/2007

* cited by examiner

*Primary Examiner* — Michael Osinski
(74) *Attorney, Agent, or Firm* — Canon U.S.A., Inc., IP Division

(57) ABSTRACT

In a case where a position information acquisition setting unit sets to acquire position information and in a case where a determination unit determines that the image data recorded in a recording medium is automatically transmitted to an external device, a transmission setting confirmation screen is displayed, so that the image data to which the position information is attached is prevented from being transmitted to the external device while the user does not intend to do so.

16 Claims, 14 Drawing Sheets

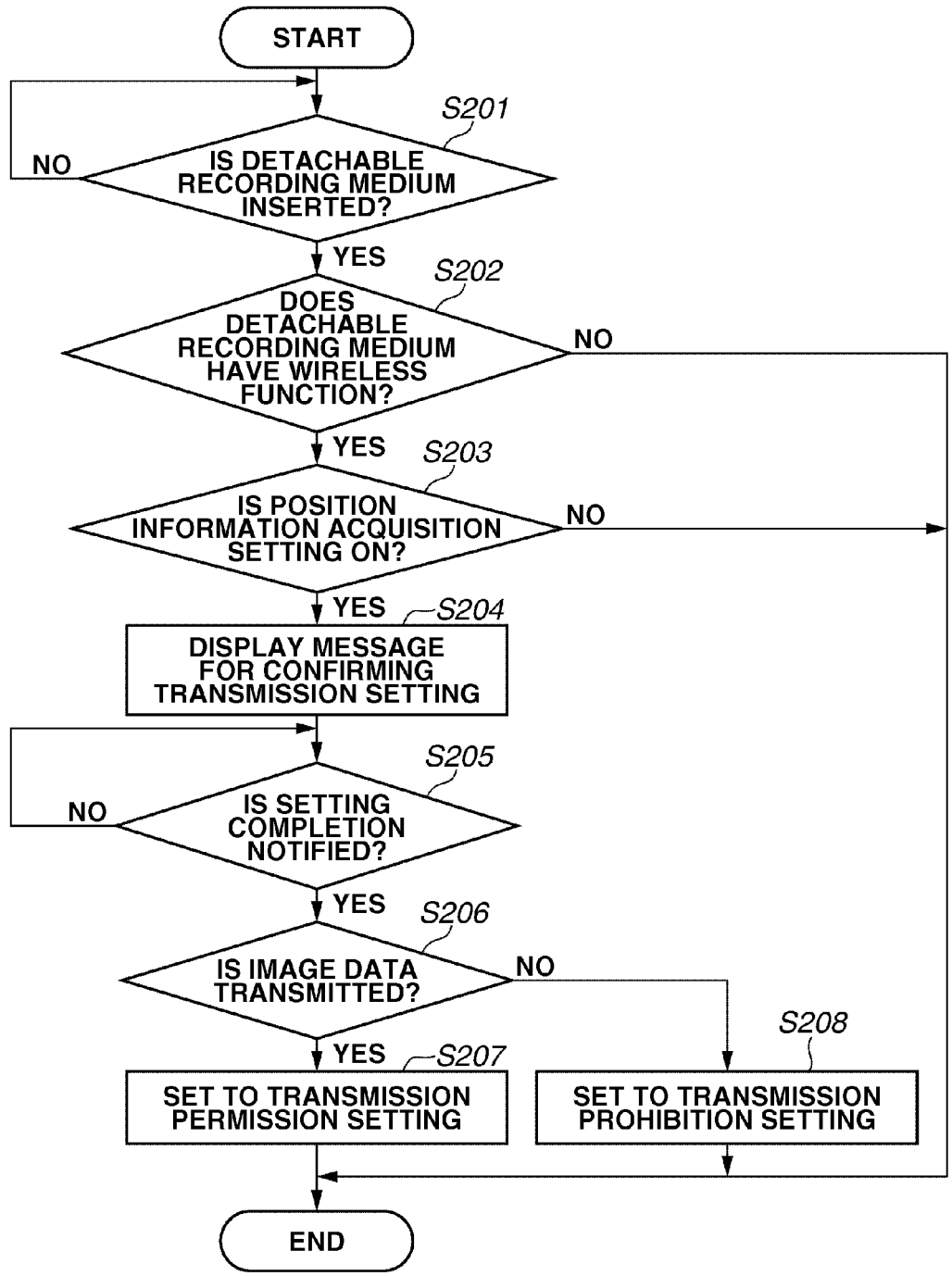

FIG.3A

PHOTOGRAPHING POSITION INFORMATION
IS ATTACHED TO A CAPTURED IMAGE.
IS THE IMAGE TO BE TRANSMITTED?

TRANSMIT
NOT TRANSMIT

FIG.3B

SELECT TRANSMISSION DESTINATION

HOME PC
OPEN WEB SERVER
PRIVATE SERVER
CANCEL

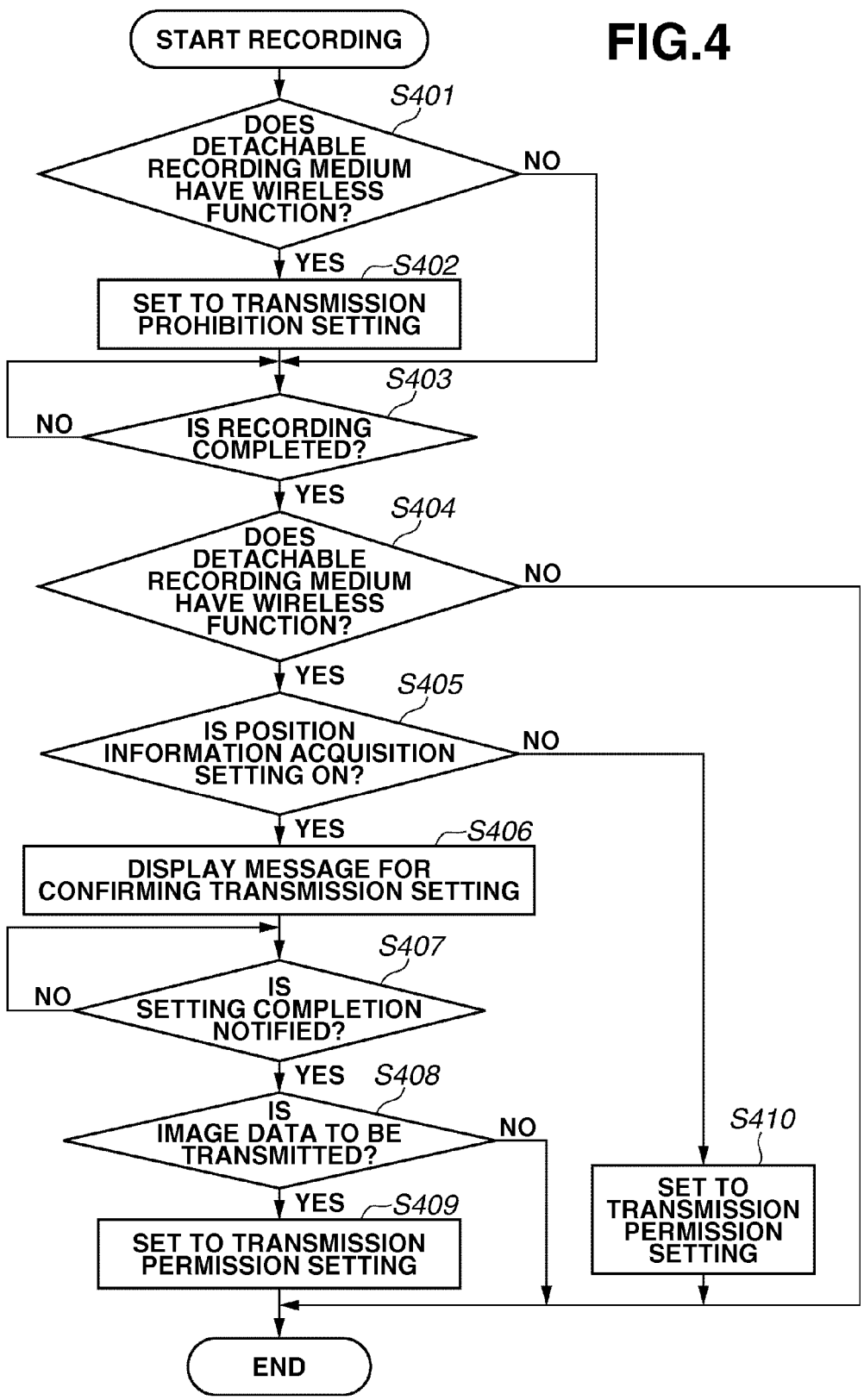

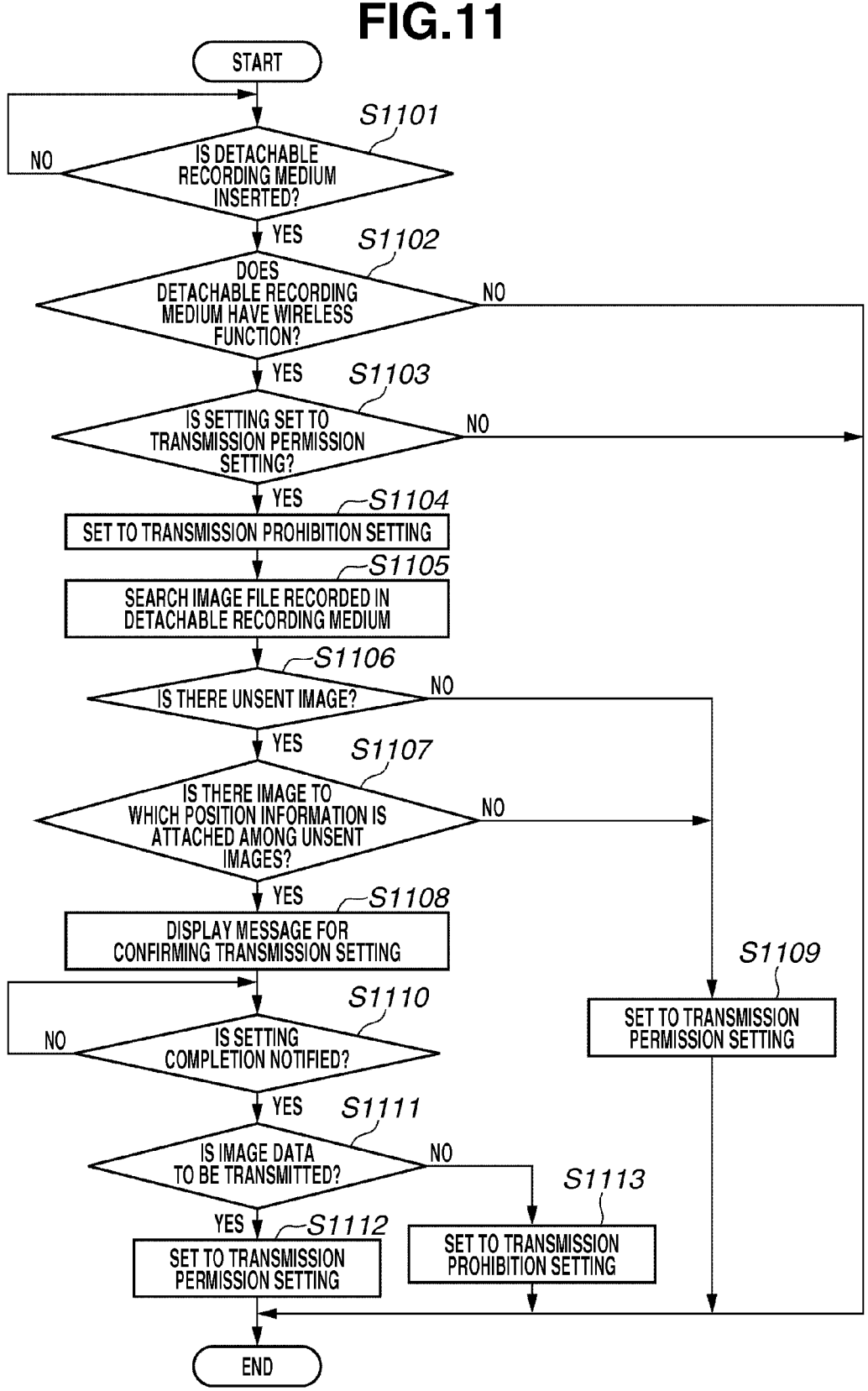

FIG.12A

THERE IS AN IMAGE TO WHICH
POSITION INFORMATION IS ATTACHED.
IS THE IMAGE PERMITTED
TO BE TRANSMITTED?

PERMIT TO TRANSMIT
NOT PERMIT TO TRANSMIT

FIG.12B

SELECT TRANSMISSION DESTINATION

HOME PC
OPEN WEB SERVER
PRIVATE SERVER
CANCEL

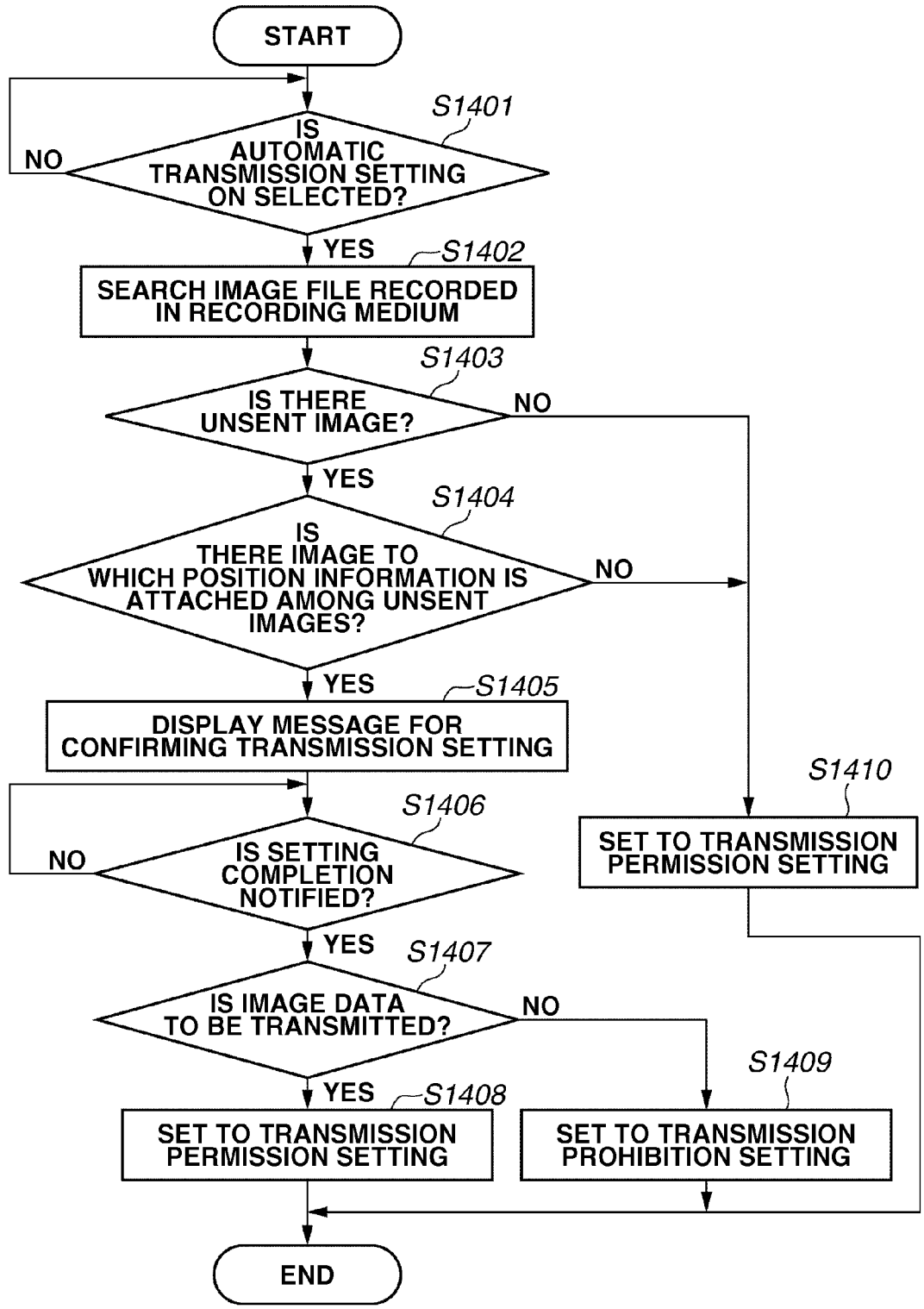

IMAGE RECORDING APPARATUS AND CONTROL METHOD

BACKGROUND OF THE INVENTION

1. Field of the Invention

The present invention relates to an image recording apparatus and an image recording method. More specifically, the present invention relates to a technique for recording position information together with image data.

2. Description of the Related Art

Currently, image data captured by various types of digital still cameras is recorded in an Exchangeable image file format (Exif). The captured image data recorded in the Exif includes many pieces of additional information in addition to a captured image. The captured image data attached to the additional information is recorded as the image file. Therefore the captured image data and the additional information attached the captured image data are managed as one data object.

Information attached to the captured image data is generally referred to as metadata. The metadata includes a model name, a serial number, and a maker name of an imaging equipment which captured the image data, and an identification symbol of a photographer, image capturing position information, a shooting condition, a shooting date and time, face information of a person to be photographed, a title, a memo, or the like. The metadata is used in searching target image data.

The metadata is used in, for example, categorizing image data by using the shooting date and time to collect image data captured at a specific date and to display a list thereof, and in categorizing the image data by using face information of a person to be photographed to collect image data including the specific person and to display a list thereof. The metadata is also used in relating the image data to which image capturing position information is attached to map data to display the captured image data on the map after superimposing the captured image data over the map data.

As described above, by using the metadata, functions convenient to a user can be realized. However, the metadata includes information possibly related to privacy of the photographer, such as the identifying symbol and the image capturing position information of the photographer, in some cases.

Recently, there is a memory card or a digital camera which has a wireless function and thus can sequentially transmit captured image data to a server without requiring the user to perform a data transfer operation if a server of a transfer destination is designated in advance. An infrastructure for uploading image data to the server is developing as described above. Therefore, a possibility rises that the image data is opened to public while private information is still attached to the image data.

To resolve the above problem, Japanese Patent Laid-open Publication No. 2007-88754 discusses a method for preventing the private information from being transmitted by transmitting image after deleting the private information from the additional information attached to the image data when the captured image data is transmitted.

However, even when the user wishes to transmit the image data after providing some editing operation, in a case where the user uses a memory card having the above described wireless function, information such as image data may be automatically transmitted before providing the editing operation to the image data.

SUMMARY OF THE INVENTION

The present invention is directed to a method for preventing information from being transmitted to the outside while the user does not intend to do so.

According to an aspect of the present invention, in a case where a position information acquisition setting unit sets to acquire position information and in a case where a determination unit determines that the image data recorded in a recording medium is automatically transmitted to an external device, a transmission setting confirmation screen is displayed, so that the image data to which the position information is attached is prevented from being transmitted to the external device while the user does not intend to do so.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a first flow chart illustrating an operation of the image recording apparatus according to the first exemplary embodiment.

FIGS. 3A and 3B illustrate examples of a transmission setting screen.

FIG. 4 is a second flow chart illustrating the operation of the image recording apparatus according to the first exemplary embodiment.

FIG. 11 is a flow chart illustrating the operation of the image recording apparatus according to the fourth exemplary embodiment.

FIGS. 12A and 12B illustrate modified examples of the transmission setting screen.

FIG. 14 is a flow chart illustrating the operation of the image recording apparatus according to the fifth exemplary embodiment.

DESCRIPTION OF THE EMBODIMENTS

Various exemplary embodiments, features, and aspects of the invention will be described in detail below with reference to the drawings.

Figure 1:
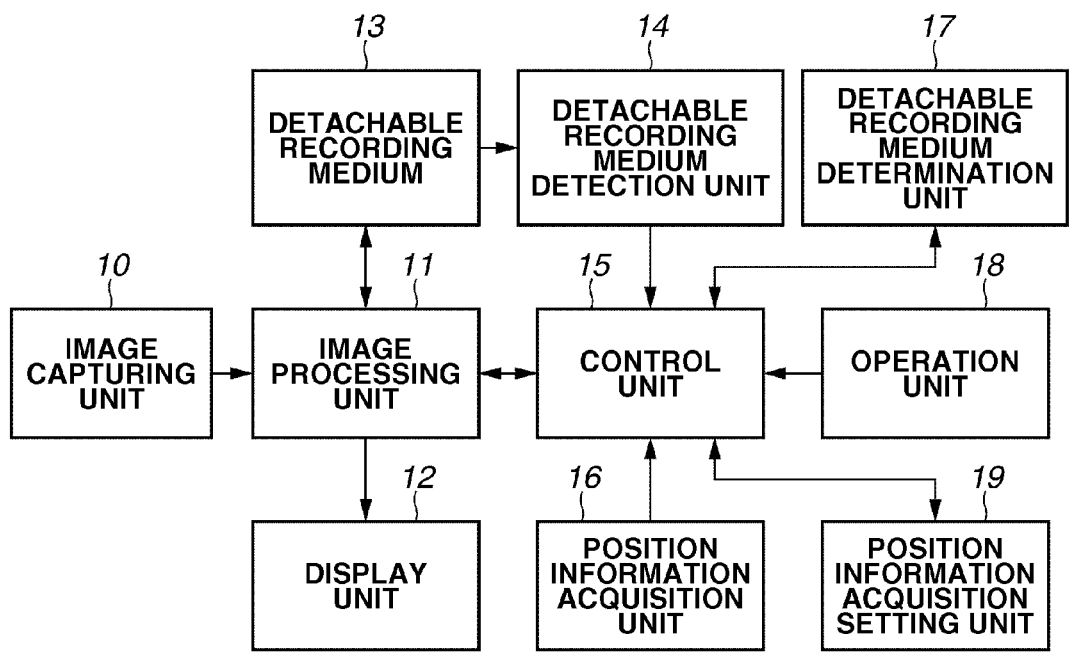
FIG. 1 is a block diagram illustrating an example of the configuration of an image recording apparatus according to a first exemplary embodiment.

A first exemplary embodiment is described below. FIG. 1 is a block diagram illustrating an example of the configuration of an image recording apparatus according to the first exemplary embodiment. A video camera is exemplified as the image recording apparatus for the purpose of description. In FIG. 1, an image capturing unit 10 includes, for example, an optical system, a motor and an image sensor for controlling the optical system (not shown). External light passing through the image capturing unit 10 forms an optical image on a surface of the image sensor. The optical image is converted into an electrical signal by the image sensor. The video camera includes a connection unit for establishing a connection between the video camera and a recording medium and can read and write data from and to the recording medium.

An image processing unit 11 converts the electrical signal into a digital data and compresses the digital data. The compressed digital data is recorded in a detachable recording medium 13 together with metadata. In addition, the image processing unit 11 performs decompression processing for image data recorded in the detachable recording medium 13 and thereafter converts the decompressed image data into data optimum for a display in order to display the data on a display unit 12. The display unit 12 can concurrently display a message for allowing a user to confirm a setting. At least one detachable recording medium 13 is provided in order to store the image data and additional information attached thereto.

A detachable recording medium detection unit 14 notifies a control unit 15 that the detachable recording medium 13 is mounted. Upon detecting mounting of the detachable recording medium 13, the control unit 15 transmits information of the detachable recording medium 13 to a detachable recording medium determination unit 17.

The detachable recording medium determination unit 17 determines whether the mounted recording medium has a wireless function. The determination may be performed by the control unit 15. A position information acquisition unit 16 acquires position information indicating a current position of the video camera. In the present exemplary embodiment, a Global Positioning System (GPS) is used as the position information acquisition unit 16. However, the position information may be acquired by using other methods, e.g., using a wireless base station. The user (i.e., operator) operates the video camera via an operation unit 18 and sets a setting whether a current image capturing position is to be acquired by the position information acquisition unit 16 to a position information acquisition setting unit 19 via the control unit 15. The position information acquisition setting unit 19 is constituted by, for example, a flash memory.

An operation of the image recording apparatus according to the first exemplary embodiment is described below with reference to flow charts of FIGS. 2 and 4. As illustrated in the flow chart of FIG. 2, in step S201, the detachable recording medium detection unit 14 detects whether the detachable recording medium 13 is mounted. A time at which the mounting of the detachable recording medium 13 is detected (YES in step S201) is recognized as a first timing (i.e., predetermined timing), and the processing proceeds to step S202.

In step S202, the detachable recording medium determination unit 17 determines whether the mounted recording medium has the wireless function (i.e., communication function). The recording medium mounted in the present embodiment includes a wireless function. In addition, the recording medium automatically transmits the image data to a server set in advance when image data is recorded in the recording medium. A transmission of a command from a host side to the recording medium enables setting of a transmission permission or transmission prohibition of the image data to the server. In the present embodiment, the host side is the video camera. A command is transmitted to the recording medium via the control unit 15.

The detachable recording medium determination unit 17 can determine whether the recording medium includes the wireless function by reading product information such as a product name from a register of the mounted recording medium. In a case where the mounted recording medium includes the wireless function (YES in step S202), the processing proceeds to step S203. In a case where the mounted recording medium does not include the wireless function (NO in step S202), the processing ends.

In step S203, the position information acquisition setting unit 19 confirms whether a setting for acquiring the image capturing position information is ON. In a case where the position information acquisition setting is ON (YES in step S203), the position information acquisition unit 16 acquires the current image capturing position information.

If the position information is generated by capturing an image by using the GPS, the latitude and the longitude can be calculated accurately. Therefore, in a case where the image is captured, for example, at a private home, an address as the privacy information may be identified from the image capturing position information.

In a case where the position information acquisition setting is OFF (NO in step S203), only image data is recorded. In a case where the position information acquisition setting is ON (YES in step S203), the processing proceeds to step S204. In a case where the position information acquisition setting is OFF (NO in step S203), the processing ends.

In step S204, the display unit 12 displays a confirmation message as illustrated in FIG. 3A. The confirmation message notifies that the image capturing position information is attached to the captured image data to be transmitted to the outside. The confirmation message includes a display for enabling the user to select whether the user intends to transmit the image data. The user selects whether to transmit the image data via the operation unit 18.

In step S205, the image recording apparatus is placed in a standby state waiting for a notification indicating whether the user completes the operation. When a notification indicating that the setting is completed is received from the user (YES in step S205), the processing proceeds to step S206. In step S206, in a case where the user selects "transmit" in step S206 (YES in step S206), the processing proceeds to step S207. In a case where the user selects "not transmit" in step S206 (NO in step S206), the processing proceeds to step S208. In step S207, the host side issues a command for permitting the transmission of the image data to the mounted detachable recording medium 13. On the other hand, in step S208, the host side issues a command for prohibiting the transmission of the image data to the detachable recording medium 13 and the processing is ended.

In FIG. 2, a case that the setting is made before capturing the image is exemplified. However, a message that the user confirms the transmission setting may be displayed on the display unit 12 as a transmission setting confirmation screen after capturing the image (i.e., after the completion of the recording of the image data). An example of display processing in the above case is described below with reference to a flow chart of FIG. 4.

In step S401, the detachable recording medium determination unit 17 determines whether the detachable recording medium 13 includes the wireless function. As a result of this determination, in a case where the detachable recording medium 13 includes the wireless function (YES in step S401), the processing proceeds to step S402 where an automatic transmission of data by using the wireless function is set to be prohibited. In step S406, the display unit 12 displays a confirmation screen of FIG. 3A in order for the image data not to be automatically transmitted before the user selects the image data transmission setting. In a case where the detachable recording medium 13 does not have the wireless function (NO in step S401), the processing proceeds to step S403.

According to the above processing, the image data after recorded can be prevented from being automatically transmitted. In particular, in a case where the image data is automatically transmitted immediately after the image data is recorded in the detachable recording medium 13, a command for prohibiting the transmission needs to be transmitted to the detachable recording medium 13, as illustrated in step S402, before the image data is completely recorded in the detachable recording medium 13. Otherwise the image data with the position information is transmitted to the server. In step S402, the image data with the position information is temporarily prohibited from being transmitted to an external server unless the user permits the transmission thereof in a transmission setting confirmation screen of FIG. 3A.

In step S403, a determination is made whether the recording is completed. After the recording is completed (YES in step S403), the processing proceeds to step S404. In step S404, the detachable recording medium determination unit 17 determines whether the mounted recording medium includes the wireless function. The determination whether the mounted recording medium includes the wireless function can be made in a manner as described above. In a case where the mounted recording medium includes the wireless function (YES in step S404), the processing proceeds to step S405. In a case where the mounted recording medium does not include the wireless function (NO in step S404), the processing ends.

Next, the position information acquisition setting unit 19 confirms whether the setting for acquiring the image capturing position information is ON. In a case where the position information acquisition setting is ON (YES in step S405), the position information acquisition unit 16 acquires the current image capturing position information and attaches the information to the image data to record it in the detachable recording medium 13. The position information may be recorded at the same time at which the user determines the position information acquisition setting in step S405 or may be recorded together with the image data upon recording the image data.

In a case where the position information acquisition setting is OFF (NO in step S405), only the image data is recorded. In a case where the position information acquisition setting is ON (YES in step S405), the processing proceeds to step S406. In a case where the position information acquisition setting is OFF (NO in step S405), the processing proceeds to step S410. In step S410, to reset the transmission prohibition setting set in step S402 where the automatic transmission of the image data is prohibited, the setting is changed to the transmission permission setting and thereafter the processing ends. In a case where the position information acquisition setting is OFF (NO in step S405), since the position information is not attached to the image data, the setting is reset to allow the image data to be automatically transmitted.

Now, in step S406, the display unit 12 displays the confirmation message illustrated in FIG. 3A. The user confirms the displayed message by the operation unit 18 to select whether to transmit the image data. The transmission setting confirmation performed after the completion of the recording may be performed every time after the completion of the recording. Alternatively, the confirmation may be performed only once after an initial recording after the detachable recording medium 13 having the wireless function is mounted and the subsequent transmission setting may be continuously kept. A description is made here provided that, but not limited thereto, the confirmation is performed after the completion of the recording. The confirmation may be performed, instead thereof, at a time of a start of the recording, immediately before the completion of the recording, at the time of a start of the image capturing, at the time of the completion of the image capturing, or the like.

In step S407, the image recording apparatus is placed in the standby state waiting for a notification indicating whether the user completes the operation. When the notification indicating that the setting is completed is received from the user (YES in step S407), the processing proceeds to step S408. In step S408, in a case where the user selects "transmit" in step S406 (YES in step S408), the processing proceeds to step S409. In a case where the user selects "not transmit" in step S406 (NO in step S408), the processing is ended since the setting has already set to the automatic transmission prohibition setting in step S402.

In step S409, the host side issues a command for permitting the transmission of the image data to the mounted detachable recording medium 13. In the present exemplary embodiment, there is described to be a sequence for searching whether the image capturing position information acquisition setting is ON when the detachable recording medium having the wireless function is mounted but the orderly sequence is not necessarily limited to the above. For example, the following sequence may also be employed. Specifically, a determination is made in advance as to whether the image capturing position information acquisition setting is ON. Only in a case where the image capturing position information acquisition setting is ON, whether the detachable recording medium having the wireless function is mounted is checked. Then, in a case where a determination is made that the recording medium having the wireless function is mounted, the message for confirming the transmission setting may be displayed.

In the flow chart of FIG. 4, there is described to be a sequence for searching whether the detachable recording medium having the wireless function is mounted and whether the image capturing position information acquisition setting is ON in response to the completion of the recording of the image data. However, the present invention is not limited to this sequence. For example, the following sequence may also be employed.

Before starting the recording (or before completing the recording) of the image data, whether the detachable recording medium having the wireless function is mounted and whether the image capturing position information acquisition setting is ON are checked in advance. In a case where a determination is made that the detachable recording medium having the wireless function is mounted and the image capturing position information acquisition setting is ON, the automatic transmission setting is temporarily prohibited so as to prohibit the automatic transmission of the image data to be recorded in a manner similar as in step S402 and, after the image data is completely recorded, the confirmation message for setting the transmission as illustrated in FIG. 3A is displayed. In a case where the "transmit" is selected in the confirmation message, the automatic transmission setting that has been temporarily prohibited is permitted, whereas, in a case where the "not transmit" is selected in the confirmation message, the automatic transmission setting is kept prohibited.

Figure 5:
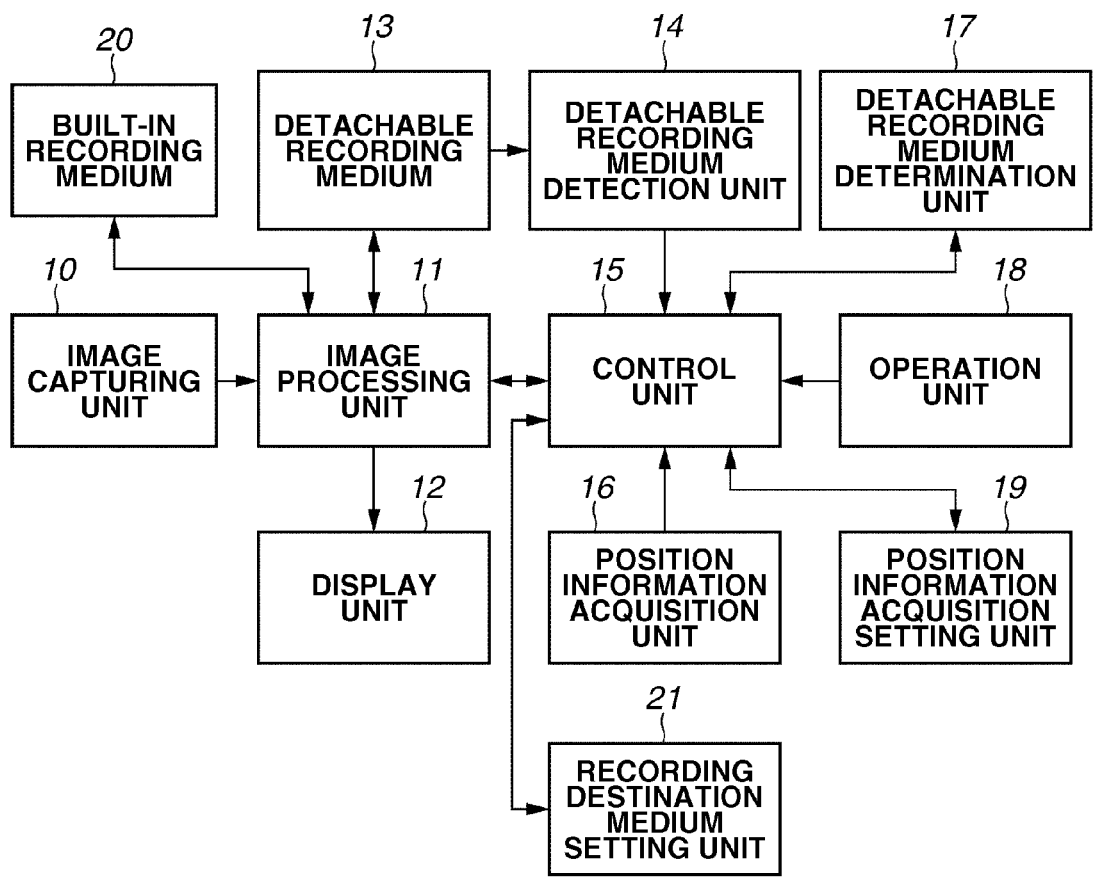
FIG. 5 is a block diagram illustrating an example of the configuration of the image recording apparatus according to a second exemplary embodiment.

Now, a second exemplary embodiment is described below. Since many portions are in common between the second exemplary embodiment and the first exemplary embodiment, descriptions of the common portions are omitted here and mainly portions unique to the present exemplary embodiment are described below. FIG. 5 illustrates a block diagram for realizing the second exemplary embodiment. Components identical to those of the first exemplary embodiment are provided with the same numerals as those in FIG. 1 and the descriptions thereof are omitted here. In FIG. 5, a built-in recording medium 20 and a recording destination medium setting unit 21 are added to the configuration of FIG. 1. The recording destination medium setting unit 21 makes a setting whether the captured image data is to be recorded in the detachable recording medium 13 or to be recorded in the built-in recording medium 20, or alternatively, to be recorded in both of them.

Figure 6:
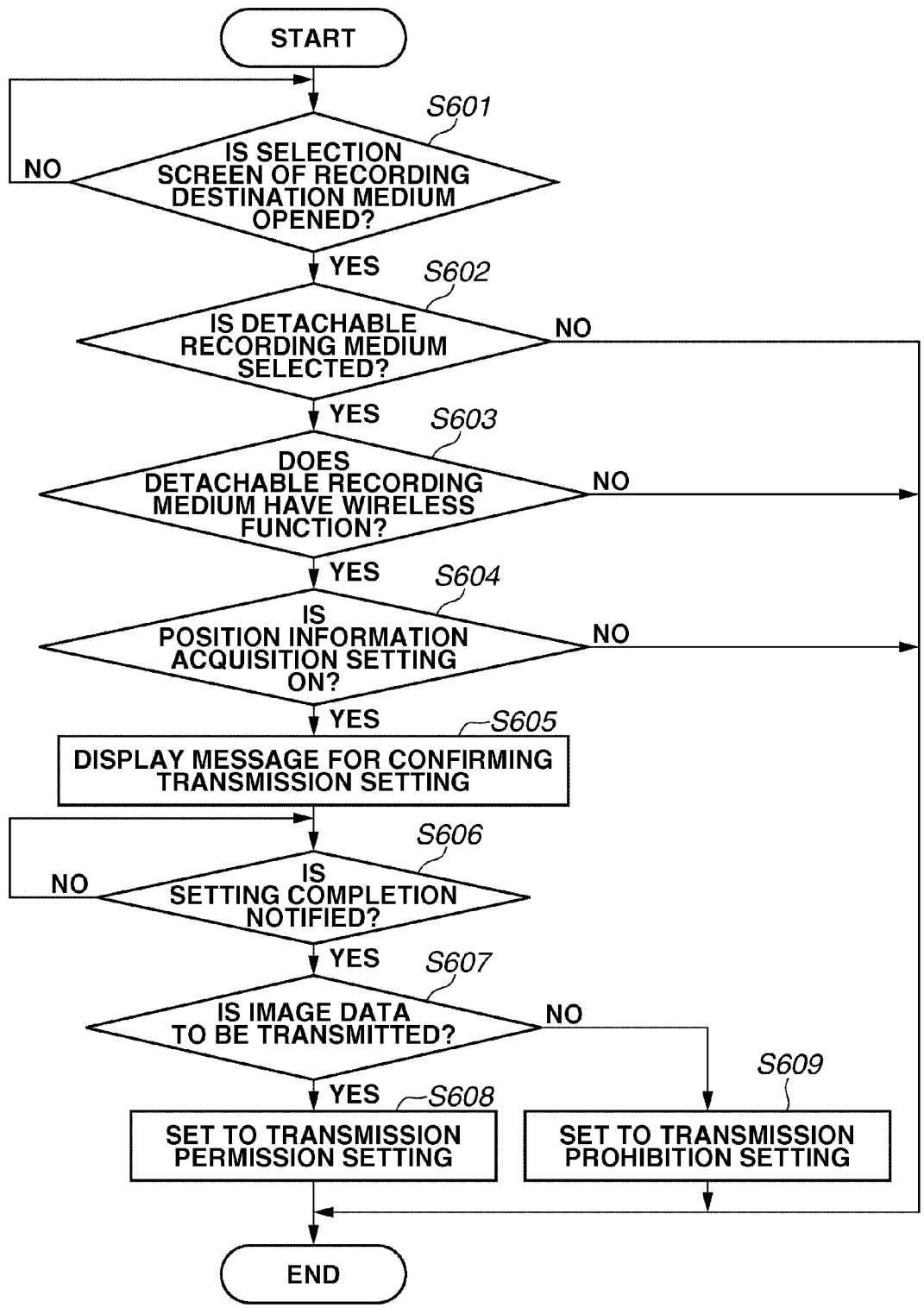
FIG. 6 is a flow chart illustrating the operation of the image recording apparatus according to the second exemplary embodiment.

An operation of the image recording apparatus according to the second exemplary embodiment is described below with reference to a flow chart of FIG. 6. In step S601, it is detected whether a display of a selection screen of the recording destination medium is requested by the user through the operation of the operation unit 18. In a case where the display request of the selection screen of the recording destination medium from the user is detected (YES in step S601), the processing proceeds to step S602.

In step S602, the recording destination medium setting unit 21 detects whether the detachable recording medium 13 is selected as the recording destination medium. In a case where the detachable recording medium 13 is selected (YES in step S602), the processing proceeds to step S603. In a case where the built-in recording medium is selected (NO in step S602), the processing is ended. Therefore, in a case where the built-in recording medium is selected, the determinations in steps S603 and S604 and the display of the confirmation message in step S605 are not performed. In other words, in a case where the built-in recording medium is selected, the confirmation messages as illustrated in FIG. 3A are not displayed even in a case where the detachable recording medium having the wireless function is set so as to automatically transmit the image data and a case where the position information acquisition setting is ON.

In step S603, the detachable recording medium determination unit 17 determines whether the mounted recording medium has the wireless function. In a case where the mounted recording medium has the wireless function (YES in step S603), the processing proceeds to step S604. In a case where the mounted recording medium does not have the wireless function (NO in step S603), the processing is ended.

In step S604, it is confirmed whether the setting for acquiring the image capturing position information is ON by the position information acquisition setting unit 19. In a case where the position information acquisition setting is ON (YES in step S604), the position information acquisition unit 16 acquires the current image capturing position information and relates the information to the image data to record the image data together with the information in the detachable recording medium 13 or the built-in recording medium 20.

In a case where the position information acquisition setting is OFF (NO in step S604), only the image data is recorded. In a case where the position information acquisition setting is ON (YES in step S604), the processing proceeds to step S605.

In a case where the position information acquisition setting is OFF (NO in step S604), the processing is ended.

In step S605, the display unit 12 displays the confirmation message as illustrated in FIG. 3A. The user can set a transmission setting by the operation unit 18 in displaying the confirmation message.

In step S606, the image recording apparatus is placed in a standby state waiting for a notification indicating whether or not an operation of the user is completed. When the notification indicating that the setting is completed is received from the user (YES in step S606), the processing proceeds to step S607. In step S607, in a case where the user selects "transmit" in step S605 (YES in step S607), the processing proceeds to step S608. In a case where the user selects "not transmit" in step S605 (NO in step S607), the processing proceeds to step S609. In step S608, the host side issues a transmission permission command to the mounted detachable recording medium 13. On the other hand, in step S609, the host side issues a transmission prohibition command to the mounted detachable recording medium 13 and the processing is ended.

In the present exemplary embodiment, 2 recording media such as the detachable recording medium 13 and the built-in recording medium 20 are exemplified for the purpose of description. However, the number of recording media is not limited to 2, but may be a plurality of recording media among which at least 1 detachable recording medium is included. For example, both of the 2 recording media may be the detachable recording media or the number of recording media may be more than 3.

Figure 7:
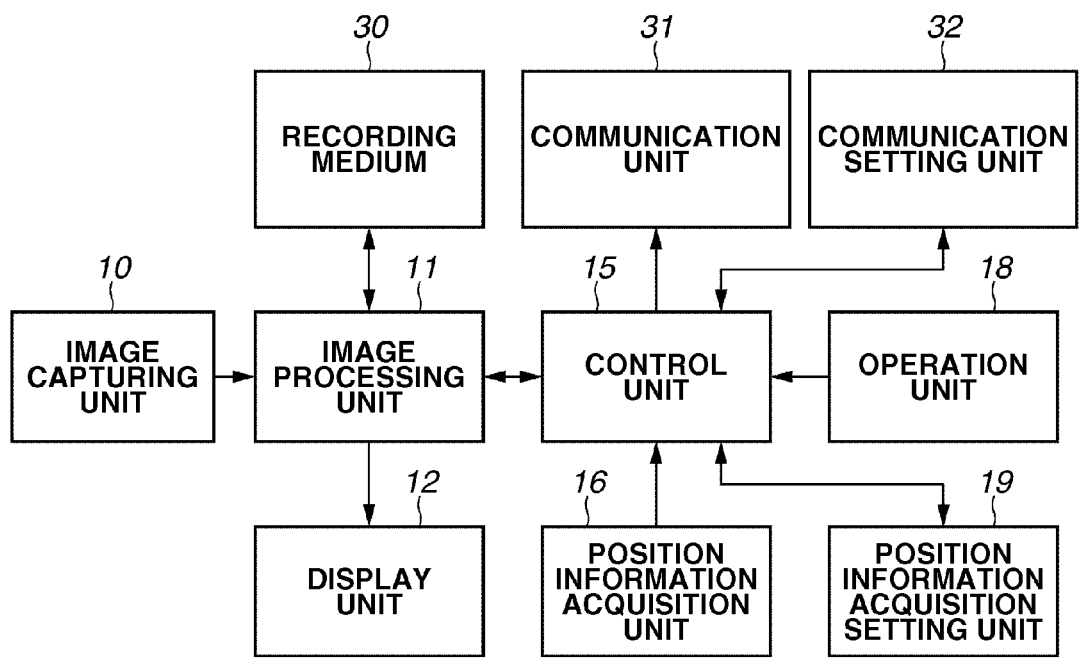
FIG. 7 is a block diagram illustrating an example of the configuration of the image recording apparatus according to a third exemplary embodiment.

Now, a third exemplary embodiment is described below. Since many portions are in common between the third exemplary embodiment and the first exemplary embodiment, descriptions of the common portions are omitted here and mainly the portions unique to the present exemplary embodiment are described below. FIG. 7 illustrates a block diagram for realizing the third exemplary embodiment. Components identical to those of the first exemplary embodiment are provided with the same numerals as those of FIG. 1 and descriptions thereof are omitted here. In FIG. 7, the detachable recording medium 13, the detachable recording medium detection unit 14, and the detachable recording medium determination unit 17 are deleted from the configuration of FIG. 1. A recording medium 30, a communication unit 31, and a communication setting unit 32 are added, instead thereof, to the configuration of FIG. 1.

The recording medium 30 may be either one of the built-in recording medium or the detachable recording medium to record the captured image data. The user operates the video camera via the operation unit 18 and sets whether to automatically transmit the captured image data or to which server the image data is to be transmitted to the communication setting unit 32 via the control unit 15.

Now, an operation of the image recording apparatus according to the third exemplary embodiment is described below with reference to a flow chart of FIG. 8. In step S801, the communication setting unit 32 confirms whether a setting for automatically transmitting the image data to the server as the external device via the communication unit 31 is ON. In a case where the automatic transmission setting is ON (YES in step S801), the image data is automatically transmitted to the server which the user sets in advance when the image data is recorded in the recording medium 30. At the time of the automatic transmission, the user does not need to provide an operation for instructing transmission of the image data. In a case where the communication setting unit 32 is determined that the automatic transmission setting is ON in step S801 (YES in step S801), the processing proceeds to step S802.

Now, in step S802, it is confirmed whether the setting for acquiring the image capturing position information is ON by the position information acquisition setting unit 19. In a case where the position information acquisition setting is ON (YES in step S802), the position information acquisition unit 16 acquires the current image capturing position information and relates the information to the captured image data to record the image data with the information in the recording medium 30.

In a case where the position information acquisition setting is OFF (NO in step S802), only the image data is recorded. In a case where the position information acquisition setting is ON (YES in step S802), the processing proceeds to step S803. In a case where the position information acquisition setting is OFF (NO in step S802), the processing returns to step S801. In other words, in steps S801 and S802, detected is that the automatic transmission setting is ON and the image capturing position information acquisition setting is ON.

In step S803, the display unit 12 displays the confirmation message illustrated in FIG. 3A. The user confirms the displayed message by the operation unit 18 and selects whether to transmit the image data. In a case where the user selects the setting for transmitting the image data, the display unit 12 further displays the screen for setting the transmission destination server as illustrated in FIG. 3B to cause the user to set more detail.

In step S804, the image recording apparatus is placed in a standby state waiting for a notification indicating that the operation of the user is completed. When the notification indicating that the setting is completed is received from the user (YES in step S804), the processing proceeds to step S805. In step S805, in a case where the user selects "transmit" in step S803 (YES in step S805), the processing proceeds to step S806. In a case where the user selects "not transmit" in step S803 (NO in step S805), the processing proceeds to step S807. In step S806, the transmission setting is set to the automatic transmission ON. On the other hand, in step S807, the transmission setting is set to the automatic transmission OFF and the processing is ended.

Figure 8:
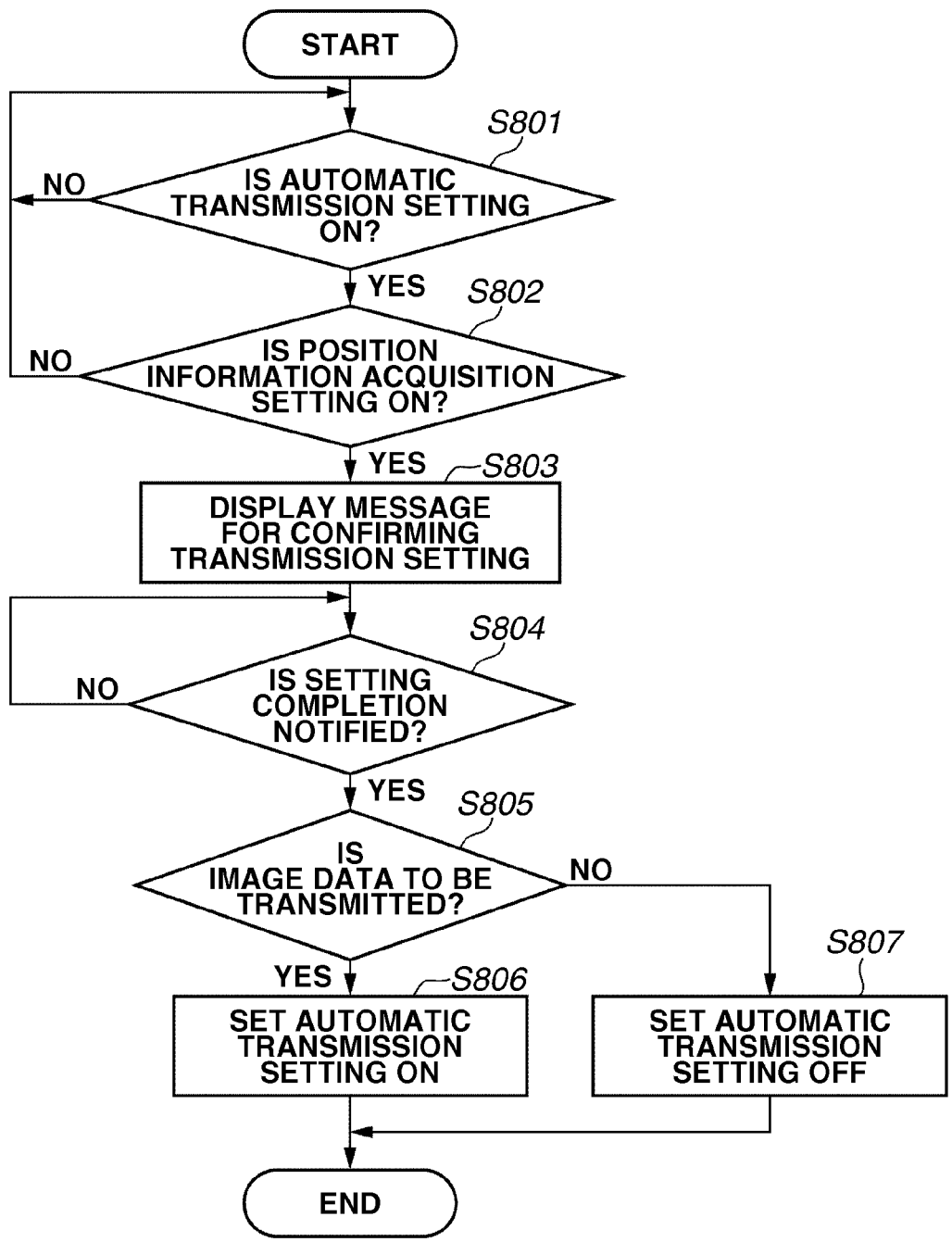
FIG. 8 is a first flow chart illustrating the operation of the image recording apparatus according to the third exemplary embodiment.
Figure 9:
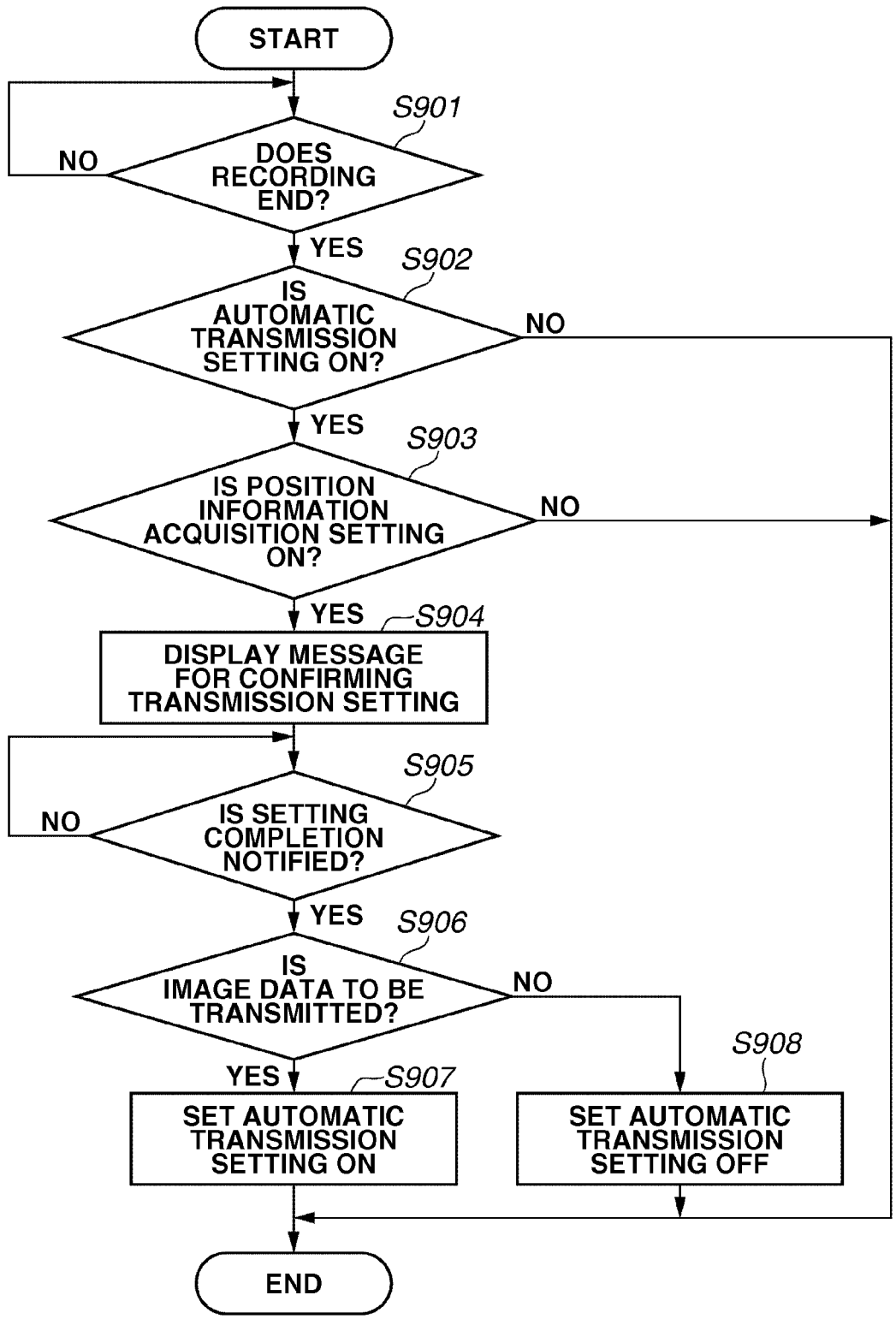
FIG. 9 is a second flow chart illustrating the operation of the image recording apparatus according to the third exemplary embodiment.

In FIG. 8, setting before capturing the image is exemplified but the message for allowing the user to confirm the transmission setting may be displayed after capturing the image. The above case is described below with reference to a flow chart of FIG. 9. In step S901, a determination is made as to whether or not the recording is completed. In a case where the recording is completed (YES in step S901), the processing proceeds to step S902.

In step S902, the communication setting unit 32 confirms whether the setting that the image data is automatically transmitted to the server via the communication unit 31 is ON. In a case where the automatic transmission is ON (YES in step S902), the image data is automatically transmitted without requiring the user to perform the data transfer operation to the server the user set in advance when the captured image data is recorded in the recording medium 30. In step S902, in a case where a determination is made that the automatic transmission setting is ON (YES in step S902), the processing proceeds to step S903. On the other hand, in a case where a determination is made that the automatic transmission setting is OFF (NO in step S902), the processing is ended.

In step S903, the position information acquisition setting unit 19 confirms whether the setting for acquiring the image capturing position information is ON. In a case where the position information acquisition setting is ON (YES in step S903), the position information acquisition unit 16 acquires the current image capturing position information and relates the information to the captured image data to record the image data with the information in the recording medium 30. The image capturing position information can be acquired, for example, by using, but not limited to, the GPS.

In a case where the position information acquisition setting is OFF (NO in step S903), only the image data is recorded. In a case where the position information acquisition setting is ON (YES in step S903), the processing proceeds to step S904. On the other hand, in a case where the position information acquisition setting unit 19 is determined that the position information acquisition setting is OFF (NO in step S903), the processing is ended.

In step S904, the display unit 12 displays the confirmation message illustrated in FIG. 3A. The user confirms the displayed message and selects whether to transmit the image data. In a case where the user selects the transmission setting, a screen for setting the transmission destination server as illustrated in FIG. 3B is further displayed to allow the user to make the setting in detail.

The transmission setting confirmation after the recording is completed may be performed every time after the recording is completed. Alternatively, the transmission setting confirmation may be performed only once after an initial recording is completed. Subsequently, the transmission setting may be continuously kept. A description is made provided that the transmission setting confirmation is performed after the recording is completed. However, the present invention is not limited thereto but the transmission setting confirmation may be performed at the start of the recording or immediately before the end of the recording.

In step S905, the image recording apparatus is placed in a standby state waiting for a notification indicating that the operation of the user is completed. When the notification indicating that the setting is completed is received from the user (YES in step S905), the processing proceeds to step S906. In step S906, in a case where the user selects "transmit" in step S904 (YES in step S906), the processing proceeds to step S907. In a case where the user selects "not transmit" in step S904 (NO in step S906), the processing proceeds to step S908. In step S907, the automatic transmission setting is made to be ON. On the other hand, in step S908, the automatic transmission setting is made to be OFF and the processing is ended.

Figure 10:
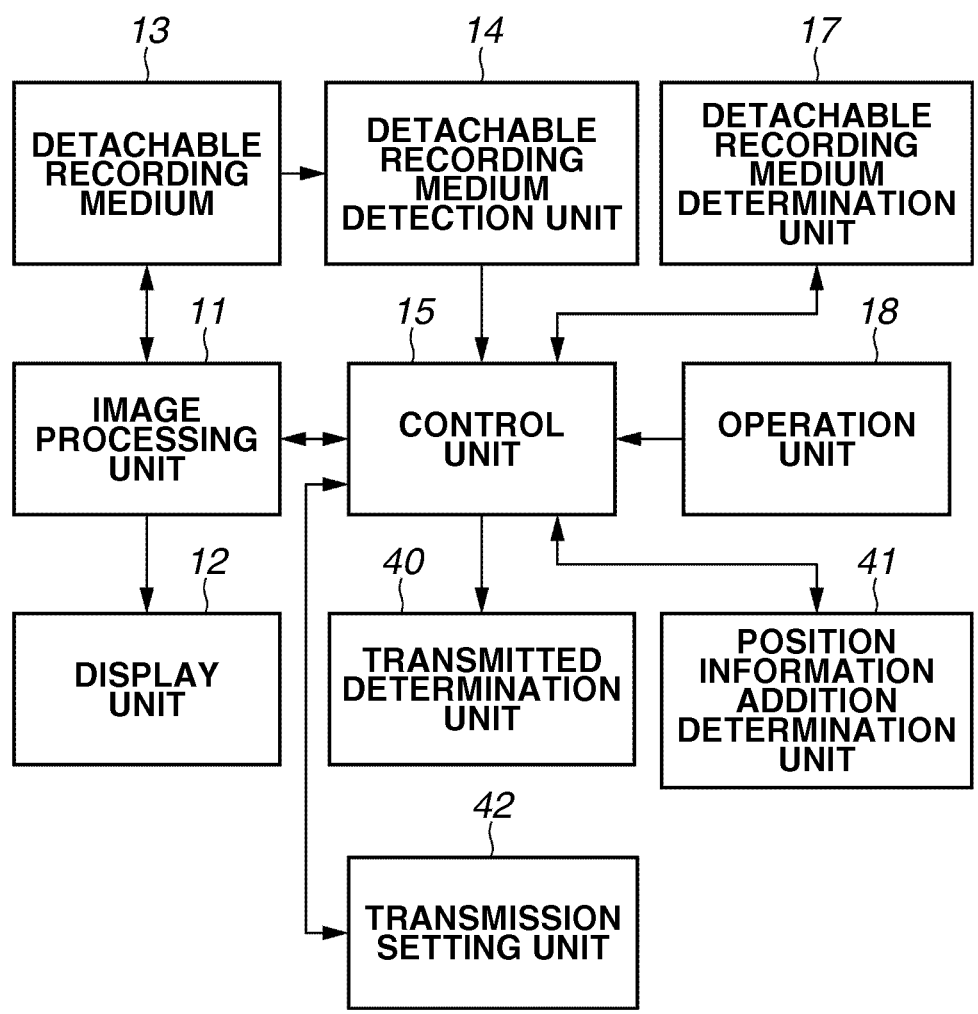
FIG. 10 is a block diagram illustrating an example of the configuration of the image recording apparatus according to a fourth exemplary embodiment.

A fourth exemplary embodiment is described below. Many portions are in common between the fourth exemplary embodiment and the first exemplary embodiment, so that descriptions of the common portions are omitted here and mainly portions unique to the present exemplary embodiment are described below. FIG. 10 illustrates a block diagram for realizing the fourth exemplary embodiment. Components identical to those of the first exemplary embodiment are provided with the same numerals as those in FIG. 1 and descriptions thereof are omitted here. In FIG. 10, the image capturing unit 10, the position information acquisition unit 16, and the position information acquisition setting unit 19 are deleted from the configuration illustrated in FIG. 1. A transmitted determination unit 40, a position information addition determination unit 41, and a transmission setting unit 42 are added to the configuration of FIG. 1.

The transmitted determination unit 40 is a block to determine whether there is image data that is not transmitted to the external device in the image data recorded in the mounted detachable recording medium 13. The position information addition determination unit 41 is a block to determine whether the position information is attached to the image data recorded in the detachable recording medium 13. The transmission setting unit 42 is a block to make a setting as to whether the image data recorded in the detachable recording medium 13 is automatically transmitted.

An operation of the image recording apparatus according to the fourth exemplary embodiment is described below with reference to a flow chart of FIG. 11. In step S1101, the detachable recording medium detection unit 14 detects whether the detachable recording medium 13 is mounted. In a case where the mounting of the detachable recording medium 13 is detected (YES in step S1101), the processing proceeds to step S1102.

In step S1102, the detachable recording medium determination unit 17 determines whether the mounted recording medium 13 has the wireless function. In a case where the mounted recording medium 13 has the wireless function (YES in step S1102), the processing proceeds to step S1103. In a case where the mounted recording medium does not have the wireless function (NO in step S1102), the processing is ended.

In step S1103, the transmission setting unit 42 is determined whether the transmission permission is set. In a case where the transmission is permitted (YES in step S1103), the processing proceeds to step S1104. In a case where the transmission is prohibited (NO in step S1103), the processing is ended. In step S1104, the host side issues a command for prohibiting the transmission of the image data to the detachable recording medium 13 such that the image is not automatically transmitted before the user confirms the setting.

In step S1105, the image data recorded in the detachable recording medium 13 is searched to check the additional information thereof. In step S1106, the transmitted determination unit 40 determines whether there is unsent image data based on the additional information checked in step S1105. In a case where the transmitted determination unit 40 determines that there is the unsent image data (YES in step S1106), the processing proceeds to step S1107. On the other hand, in a case where the transmitted determination unit 40 determines that there is no unsent image data (NO in step S1106), the processing proceeds to step S1109. In step S1109, the host side issues a command for permitting the transmission of the image data to the detachable recording medium 13 and the processing is ended.

In step S1107, the position information addition determination unit 41 determines whether there is image data to which the position information is attached in the unsent images detected in step S1106. In a case where the position information addition determination unit 41 determines that there is the image data to which the position information is attached in the unsent image data (YES in step S1107), the processing proceeds to step S1108. On the other hand, in a case where the position information addition determination unit 41 determines that there is no image data to which the position information is attached in the unsent image data (NO in step S1107), the processing proceeds to step S1109.

In step S1109, the host side issues a command for permitting the transmission of the image data to the detachable recording medium 13 and the processing is ended. A determination as to whether the image data is transmitted or whether or not the position information is attached to the image data may be made, for example, such that the information is attached to the image data as the metadata upon capturing the image and the metadata may be referred to.

Alternatively, such a method may also be employed that the information indicating whether the transmitted information and the position information are attached to a separate file is recorded, the information is related to the image data to record it upon capturing the image, and the related file is referred to. The above described methods are mere examples and thus the applicable method is not limited to them.

In step S1108, the display unit 12 displays a confirmation message indicating whether to permit to transmit the image data to which the position information illustrated in FIG. 12A is attached. The user makes the transmission setting by the operation unit 18 according to the displayed message.

In step S1110, the image recording apparatus is placed in a standby state waiting for a notification indicating that the user completes the operation. When the notification indicating that the setting is completed is received from the user (YES in step S1110), the processing proceeds to step S1111. In step S1111, in a case where the user selects "permit to transmit" in step S1108 (YES in step S1111), the processing proceeds to step S1112. In a case where the user selects "not permit to transmit" in step S1108 (NO in step S1111), the processing proceeds to step S1113. In step S1112, the host side issues a command for permitting the transmission of the image data to the mounted detachable recording medium 13. On the other hand, in step S1113, the host side issues a command for prohibiting the transmission of the image data to the mounted detachable recording medium 13 and the processing is ended.

Figure 13:
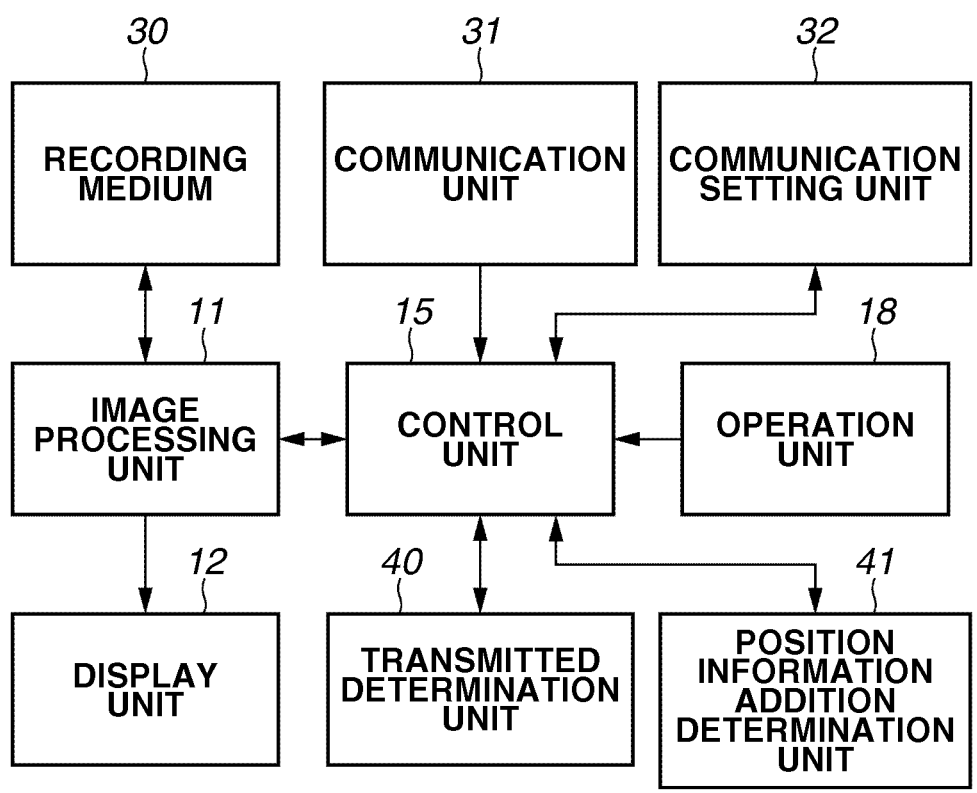
FIG. 13 is a block diagram illustrating an example of the configuration of the image recording apparatus according to a fifth exemplary embodiment.

Now, a fifth exemplary embodiment is described below. Since many portions are in common between the fifth exemplary embodiment and the first exemplary embodiment, descriptions of the common portions are omitted here and mainly the portions unique to the present exemplary embodiment are described below. FIG. 13 illustrates a block diagram for realizing the fifth exemplary embodiment. Components identical to those of the first exemplary embodiment are provided with the same numerals as those in FIG. 1 and descriptions thereof are omitted here. In FIG. 13, the image capturing unit 10, the detachable recording medium 13, the detachable recording medium detection unit 14, the detachable recording medium determination unit 17, the position information acquisition unit 16, and the position information acquisition setting unit 19 are deleted from the configuration illustrated in FIG. 1. The recording medium 30, the communication unit 31, the communication setting unit 32, the transmitted determination unit 40, and the position information addition determination unit 41 are added to the configuration of FIG. 1.

The recording medium 30 may be either one of the built-in recording medium or the detachable recording medium to record the captured image data. The user operates the video camera via the operation unit 18 and sets, for example, whether to automatically transmit the image or to which server the image is to be transmitted to the communication setting unit 32 via the control unit 15.

The transmitted determination unit 40 is a block to determine whether there is the image data that is not transmitted to an external device in the image data recorded in the recording medium 30. The position information addition determination unit 41 is a block to determine whether the position information is attached to the image data recorded in the recording medium 30.

An operation of the image recording apparatus according to the fifth exemplary embodiment is described below with reference to a flow chart of FIG. 14. In step S1401, the communication setting unit 32 is confirmed whether the setting for automatically transmitting the image data to the server via the communication unit 31 is ON. In step S1401, in a case where it is determined that the automatic transmission setting is ON (YES in step S1401), the processing proceeds to step S1402.

In step S1402, the image data recorded in the recording medium 30 is searched and the additional information thereof is checked. In step S1403, the transmitted determination unit 40 determines whether there is an unsent image based on the additional information searched in step S1402. In a case where the transmitted determination unit 40 determines that there is the unsent image data (YES in step S1403), the processing proceeds to step S1404. On the other hand, in a case where the transmitted determination unit 40 determines that there is no unsent image data (NO in step S1403), the processing proceeds to step S1410. In step S1410, the host side issues a command for permitting the transmission of the image data to the recording medium 30 and the processing is ended.

In step S1404, the position information addition determination unit 41 determines whether there is the image data to which the position information is attached based on the unsent image data detected in step S1403. In a case where the position information addition determination unit 41 determines that there is the image data to which the position information is attached in the unsent image data (YES in step S1404), the processing proceeds to step S1405. On the other hand, in a case where the position information addition determination unit 41 determines that there is no image data to which the position information is attached in the unsent image data (NO in step S1404), the processing proceeds to step S1410.

In step S1410, the host side issues a command for permitting the transmission of the image data to the recording medium 30 and the processing is ended. A determination as to whether the image data is transmitted or whether the position information is attached to the image data may be made, for example, such that the information is attached to the image data as metadata upon capturing the image data and the metadata is referred to.

Such a method may also be employed that information indicating that the image data has already transmitted to the other file and information indicating whether the position information is attached to the other file are recorded and the information is related to the image data to record it upon capturing the image data and the related file is referred to. The above described methods are mere examples and thus the method is not limited thereto.

In step S1405, the display unit 12 displays a confirmation message indicating whether to permit to transmit the image data to which the position information illustrated in FIG. 12A is attached. The user makes the transmission setting by the operation unit 18 according to the displayed message.

In step S1406, the image recording apparatus is placed in a standby state waiting for a notification whether the user completes the operation. When the notification indicating that the user completes the setting operation (YES in step S1406), the processing proceeds to step S1407. In step 1407, in a case where the user selects "transmit" in step S1405 (YES in step S1407), the processing proceeds to step S1408. In a case where the user selects "not transmit" in step S1405 (NO in step S1407), the processing proceeds to step S1409. In step S1408, the host side issues a command for permitting the transmission of the image data to the mounted recording medium 30. On the other hand, in step S1409, the host side issues a command for prohibiting the transmission of the image data to the mounted recording medium 30 and the processing is ended.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-277179 filed Dec. 13, 2010, which is hereby incorporated by reference herein in its entirety.

What is claimed is:

1. An image recording apparatus, comprising:
a mounting unit configured to mount a detachable recording medium for storing image data with additional information;
a position information acquisition unit configured to acquire position information;
a position information acquisition setting unit configured to preliminary set whether to acquire the position information by the position information acquisition unit;
a recording unit configured, in a case where the position information acquisition setting unit sets to acquire the position information, to record the image data with the position information acquired by the position information acquisition unit in a recording medium mounted to the mounting unit, and, in a case where the position information acquisition setting unit does not set to acquire the position information, to record the image data in the recording medium mounted to the mounting unit without the position information;
a determination unit configured to determine whether the image data recorded in the recording medium mounted to the mounting unit is automatically transmitted to an external device other than the image recording apparatus by a communication function included in the recording medium; and
a control unit configured to control a display unit to display a transmission setting confirmation screen for allowing a user to confirm a transmission setting of the image data to be recorded in the recording medium,
wherein, in a case where the position information acquisition setting unit sets to acquire the position information and a case where the determination unit determines that the image data recorded in the recording medium is automatically transmitted to the external device, the control unit controls displaying the transmission setting confirmation screen.

2. The image recording apparatus according to claim 1, wherein the determination unit determines, in a case where the recording medium mounted to the mounting unit has the communication function of automatically transmitting the recorded data, that the image data recorded in the recording medium is automatically transmitted to the external device.

3. The image recording apparatus according to claim 1, further comprising:
an automatic transmission setting unit configured, in a case where the recording medium having the communication function is mounted to the mounting unit, to cause the user to set whether the data recorded in the recording medium is to be automatically transmitted;

wherein the determination unit determines, in a case where the automatic transmission setting unit sets the automatic transmission setting, that the image data recorded in the recording medium is automatically transmitted to the external device.

4. The image recording apparatus according to claim 1, further comprising:
a detection unit configured to detect the mounting of the recording medium to the mounting unit;
wherein the control unit controls displaying a transmission setting confirmation screen according to the result that the detection unit detects the mounting of the recording medium.

5. The image recording apparatus according to claim 1, wherein the control unit controls displaying the transmission setting confirmation screen when the recording unit records the image data in the recording medium.

6. The image recording apparatus according to claim 1, wherein the control unit controls displaying the transmission setting confirmation screen in response to a start of recording the image data in the recording medium by the recording unit.

7. The image recording apparatus according to claim 1, wherein the control unit controls displaying the transmission setting confirmation screen in response to an end of recording the image data by the recording unit.

8. The image recording apparatus according to claim 1,
wherein the setting whether to automatically transmit the image data recorded in the recording medium to the external device is selected in the transmission setting confirmation screen; and
wherein the control unit controls, in a case where the position information acquisition setting unit sets to acquire the position information, causing the image data recorded in the recording medium not to be automatically transmitted to the external device before the setting whether to automatically transmit the image data is selected in the transmission setting confirmation screen.

9. The image recording apparatus according to claim 1, further comprising:
a selection unit configured to select whether to record the image data in the recording medium mounted to the mounting unit or in the recording medium built-in the image recording apparatus;
wherein, in a case where the selection unit selects that the image data is recorded in the recording medium built-in the image recording apparatus, the control unit controls not displaying the transmission setting confirmation screen even in a case where the position information acquisition setting unit sets to acquire the position information and a case where the image data recorded in the recording medium is automatically transmitted to the external device.

10. The image recording apparatus according to claim 1, further comprising:
an image capture unit configured to capture an image to acquire an image data thereof;
wherein the recording unit records the image data captured by the image capture unit in the recording medium; and
wherein the control unit controls, in a case where the image capture unit captures the image data, displaying the transmission setting confirmation screen.

11. The image recording apparatus according to claim 10, wherein the position information acquisition unit acquires an image capturing position of the image data when the image capture unit captures the image data; and
wherein the recording unit records the image capturing position information acquired by the position information acquisition unit in the recording medium with the position information.

12. An image recording apparatus, comprising:
a mounting unit configured to mount a detachable recording medium for storing image data with additional information;
a position information acquisition unit configured to acquire position information;
a position information acquisition setting unit configured to preliminary set whether to acquire the position information by the position information acquisition unit;
a recording unit configured, in a case where the position information acquisition setting unit sets a to acquire the position information, to record the image data with the position information acquired by the position information acquisition unit in the recording medium mounted to the mounting unit and, in a case where the position information acquisition setting unit does not set to acquire the position information, to record the image data in the recording medium mounted to the mounting unit without the position information;
a determination unit configured to determine whether the image data recorded in the recording medium mounted to the mounting unit is automatically transmitted to an external device other than the image recording apparatus by a communication function included in the recording medium; and
a control unit configured to control a display unit to display a transmission setting confirmation screen for allowing a user to confirm a transmission setting,
wherein the control unit controls, in a case where the position information acquisition setting unit sets to acquire the position information, the determination unit to determine whether the image data recorded in the recording medium is automatically transmitted to the external device in response to the mounting of the recording medium to the mounting unit, and controls, in a case where the determination unit determines that the image data is automatically transmitted, the display unit to display the transmission setting confirmation screen.

13. An image capture apparatus, comprising:
an image capture unit configured to capture image data;
a mounting unit configured to mount a detachable recording medium for storing image data captured by the image capture unit with additional information;
a position information acquisition unit configured to acquire position information;
a position information acquisition setting unit configured to preliminary set whether to acquire the position information by the position information acquisition unit;
a recording unit configured to record the image data captured by the image capture unit in the recording medium mounted to the mounting unit, wherein, in a case where the position information acquisition setting unit sets to acquire the position information, the recording unit records the image with the position information acquired by the position information acquisition unit and wherein, in a case where the position information acquisition setting unit does not set to acquire the position information, the recording unit records the image data without the position information;

a determination unit configured to determine whether the image data recorded in the recording medium mounted to the mounting unit is automatically transmitted to an external device other than the image recording apparatus by a communication function included in the recording medium; and a control unit configured to control a display unit to display a transmission setting confirmation screen for allowing a user to confirm a transmission setting, wherein the control unit controls, in a case where the position information acquisition setting unit sets to acquire the position information and a case where the determination unit determines that the image data recorded in the recording medium is automatically transmitted to the external device, the display unit to display the transmission setting confirmation screen in response to capturing of the image data by the image capture unit.

14. An image recording apparatus, comprising:

a mounting unit configured to mount a detachable recording medium for storing image data with additional information;

a position information acquisition unit configured to acquire the position information;

a position information acquisition setting unit configured to preliminary set a position information acquisition setting as to whether to acquire the position information by the position information acquisition unit;

a recording unit configured to record image data in a recording medium mounted to the mounting unit with the position information acquired by the position information acquisition unit according to the position information acquisition setting set by the position information acquisition setting unit;

a determination unit configured to determine whether the image data recorded in the recording medium mounted to the mounting unit is automatically transmitted to an external device other than the image recording apparatus by a communication function included in the recording medium; and a control unit configured to control a display unit to display a transmission setting confirmation screen for allowing a user to confirm the transmission setting;

wherein the control unit controls the display unit as to whether the transmission setting confirmation screen is to be displayed according to the position information acquisition setting set by the position information acquisition setting unit and the determination result of the determination unit.

15. A control method of an image recording apparatus including a mounting unit to which a detachable recording medium for storing image data with additional information is mounted, the method comprising:

setting a position information acquisition preliminary as to whether the position information is to be acquired;

recording, in a case where the setting is made so as to acquire the position information, the image data with the acquired position information in the recording medium mounted to the mounting unit, whereas, recording, in a case where the setting is made so as not to acquire the position information, the image data in the recording medium mounted to the mounting unit without the position information;

determining whether the image data recorded in the recording medium mounted to the mounting unit is automatically transmitted to an external device other than the image recording apparatus by a communication function included in the recording medium; and displaying on a display unit a transmission setting confirmation screen for allowing a user to confirm a transmission setting of the image data recorded in the recording medium in a case where the setting is made so as to acquire the position information and a case where a determination is made that the image data recorded in the recording medium is automatically transmitted to the external device.

16. A non-transitory computer readable storage medium storing a control program for causing a computer to perform the method of claim 15.

* * * * *